No. 870,483. PATENTED NOV. 5, 1907.
W. TOWNSEND.
CENTER BEARING.
APPLICATION FILED NOV. 17, 1906.
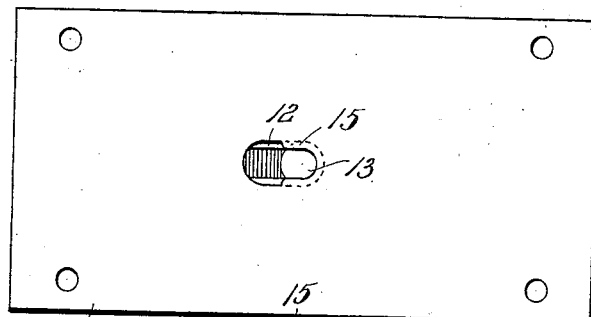
Fig. 1.
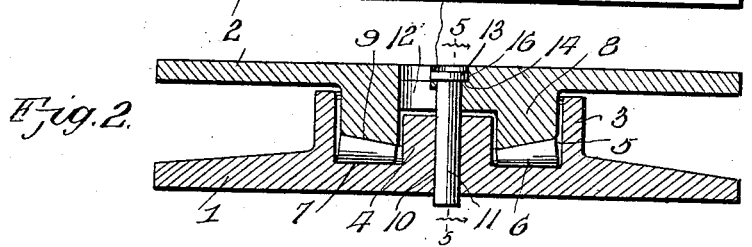
Fig. 2.
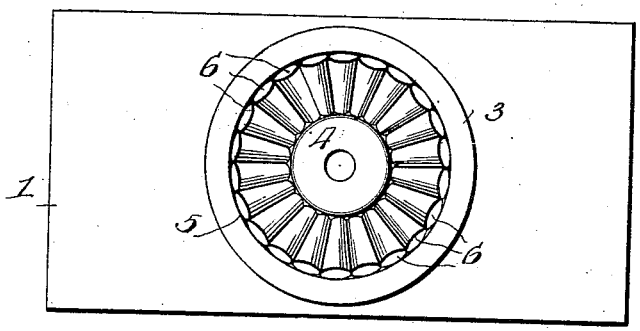
Fig. 3.
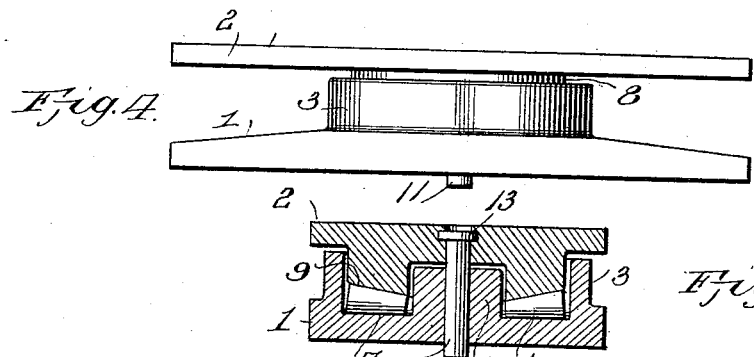
Fig. 4.
Fig. 5.
Inventor
William Townsend,
Witnesses
Frank Hough
C. C. Hines.
By Victor J. Evans
Attorney

UNITED STATES PATENT OFFICE.

WILLIAM TOWNSEND, OF MILAN, MISSOURI.

CENTER-BEARING.

No. 870,483.  Specification of Letters Patent.  Patented Nov. 5, 1907.

Application filed November 17, 1906. Serial No. 343,910.

*To all whom it may concern:*

Be it known that I, WILLIAM TOWNSEND, a citizen of the United States of America, residing at Milan, in the county of Sullivan and State of Missouri, have invented new and useful Improvements in Center-Bearings, of which the following is a specification.

This invention relates to improvements in center bearings for engines and railway cars, the object of the invention being to provide a center bearing which is simple of construction, comparatively inexpensive of manufacture, efficient in action and adapted to materially reduce friction and wear upon the parts thereof, and the parts of which are adapted to be conveniently assembled and disassembled.

In the accompanying drawing—Figure 1 is a top plan view of a center bearing embodying my invention. Fig. 2 is a central longitudinal section of the same. Fig. 3 is a top plan view of the device with the top plate or male member removed. Fig. 4 is a side elevation of the device with the parts combined for operation. Fig. 5 is a transverse section on line 5—5 of Fig. 2.

The improved center bearing embodying my invention comprises a bottom plate or female member 1 and a top plate or male member 2, which parts are suitably perforated for the passage of bolts or other fastenings to respectively secure the same to the truck and body of the car or engine.

The bottom plate 1 is formed with an upwardly extending circular flange 3 arranged concentric with an upwardly extending circular boss or projection 4, which terminates below or is of less height than the flange. The flange and boss coöperate to produce an annular chamber or raceway 5 in which is arranged an annular series of anti-friction rolls 6. These rolls are of frusto-conical form or taper inwardly, gradually decreasing in thickness from their outer to their inner ends. The base or bottom wall 7 of the raceway 5 forms a track for the rolls, and is preferably made horizontal instead of being inclined in order to maintain the rollers in working position and prevent them from shifting transversely in the raceway.

The top plate or male member 2 is formed with a depending central flange or bearing projection 8. This flange or projection is of annular form to fit within the raceway 5 and turn between the flange 3 and boss 4. The lower edge of said flange or projection 8 rests upon the series of anti-friction rollers 6 and is beveled or inclined downwardly and inwardly, as indicated at 9, to conform to the taper of said rollers. The rollers support the plate 2 and sustain the pressure or weight falling thereon and permit the plate 1 to turn or rotate with a minimum degree of friction. By beveling or inclining the lower surface 9 of the annular flange or bearing portion 8, a gravitative resistance to the outward shifting of the part 8 in any direction is secured, by which the plate 2 is effectually centered upon the plate 1 and liability of the parts binding from outward relative movement of either of the plates diminished to a material extent.

A vertical opening 10 is formed in the bottom plate and boss to receive a centering pin 11, which pin is adapted to fit at its upper end within an opening 12 formed in the top plate 2 and is provided with a head 13. The opening 12 is elongated or of elliptical form, one end thereof being arranged immediately above the opening 10. This end of the opening 12 is at the center or axis of the plate 2 and is contracted by the provision of upper and lower shoulders 14 and 15 forming an intervening groove or recess 16 to receive a portion of the head of the pin, whereby the latter will be held in working position and prevented from dropping downward. It will be observed that the shoulder 15 extends in the form of a flange around the inner half of the opening 12 and acts in the nature of a guard overhanging the head of the pin to hold it from upward displacement.

In the operation of assembling the parts the headed end of the pin is first inserted into the opening 12 and then fitted in the groove 16, after which the plate 2 is brought into position and its bearing flange or projection 8 inserted into the race-way 5 and the pin fitted into the opening 10, the headed end of the pin being held within the groove by its incapability of shifting laterally in the opening 10, it being understood that the bearing rollers 6 are inserted into the race-way 5 before the plate 2 is applied to the plate 1. When the parts are thus assembled the pin will be locked against downward or lateral displacement, although it may be removed in an obvious manner when the member 2 is disconnected from the member 1.

A center bearing constructed in accordance with my invention may be inexpensively cast and its bearing portions chilled or hardened in any preferred manner. Freedom of action of the parts upon one another is permitted without excess friction, and ready disconnection is afforded at any time without the necessity of disconnecting fastenings of any kind, the pin 11 serving simply in connection with the bearing elements to maintain the parts in centered relation. Further advantages of the improved construction will be apparent to those versed in the art and readily appreciated.

Having thus described the invention, what is claimed as new is:—

1. A center bearing comprising a bottom plate provided with an upwardly extending circular boss having a vertical opening therethrough, an upwardly extending circular flange concentric with the boss and forming therewith a raceway having a bottom track, bearing rollers arranged in the raceway and resting on the track, a top plate having a bearing portion projecting into the raceway and resting on the rollers, and a pin carried by the top plate and projecting through the opening in the boss, said plate having means for an interlocking engagement of the upper end of the pin therewith, whereby the pin is locked against movement when the parts are combined and may be disconnected by a lateral movement when the parts are released.

2. A center bearing comprising a bottom plate having an annular raceway and provided with a pin-receiving opening, a top plate having a bearing portion projecting into said raceway, anti-friction bearings between said bearing portion and the opposing surface of the raceway, the top plate being further provided with an elongated pin-receiving opening having a groove at one end thereof and a guard flange overhanging the groove, and a centering pin fitted at its lower end in the opening in the bottom plate and extending at its upper end into the opening in the top plate with a portion of its head fitted into said groove below the guard flange.

In testimony whereof, I affix my signature in presence of two witnesses.

WILLIAM TOWNSEND.

Witnesses:
M. G. EUBANKS,
GEO. T. BURNHAM.